(12) United States Patent
Williams

(10) Patent No.: US 12,126,484 B1
(45) Date of Patent: Oct. 22, 2024

(54) DIGITAL TRANSMISSION SYSTEMS USING TRANSFORMED PHASE MODULATED SIGNALS (PM-OFDM)

(71) Applicant: Thomas Holtzman Williams, Longmont, CO (US)

(72) Inventor: Thomas Holtzman Williams, Longmont, CO (US)

( * ) Notice: Subject to any disclaimer, the term of this patent is extended or adjusted under 35 U.S.C. 154(b) by 0 days.

(21) Appl. No.: 18/199,066

(22) Filed: May 18, 2023

(51) Int. Cl.
*H04L 27/36* (2006.01)
*H04L 5/00* (2006.01)

(52) U.S. Cl.
CPC ............ *H04L 27/365* (2013.01); *H04L 5/001* (2013.01); *H04L 27/367* (2013.01)

(58) Field of Classification Search
CPC ...... H04L 27/365; H04L 5/001; H04L 27/367
See application file for complete search history.

(56) References Cited

U.S. PATENT DOCUMENTS

| | | | | |
|---|---|---|---|---|
| 8,660,096 | B2 * | 2/2014 | Matsuo | H04L 5/0048 370/320 |
| 10,924,217 | B2 * | 2/2021 | Lomayev | H04L 5/0023 |
| 2008/0247483 | A1 * | 10/2008 | Seyedi-Esfahani | H04L 1/0668 375/267 |

* cited by examiner

*Primary Examiner* — Dac V Ha

(57) ABSTRACT

A constant amplitude Radio Frequency (RF) signal is created by ordering complex information bearing symbols in the frequency domain along with their complex conjugates, and performing an inverse Fourier transform. This produces an analytic real-only transformed baseband signal. The real-only baseband signal is used to linearly vary the phase angle of a carrier wave while its amplitude remains constant. After reception, multi-path distortion is canceled. A time series of recovered phase angle is un-transformed with a FFT (fast Fourier transform) to produce I (in-phase) and Q (quadrature) samples. Demodulation occurs in a receiver by recovering carrier's phase angle vs. time. Forward error correction may be applied to data if desired. This may be called PM-OFDM (Phase Modulated-orthogonal frequency division multiplexing). This modulation method produces a relatively high amplitude Continuous Wave (CW) component to assist demodulation, and subcarriers near the CW can be zeroed-out to improve the CW recovery and tracking of frequency error and phase noise. The PM-OFDM signal can also be linearly precoded, creating PM-LP-OFDM. PM-LP-OFDM has a characteristic of a lower phase angle crest factor, enabling a lower peak phase rotation. Outer frequency subcarriers can be nulled to reduce occupied bandwidth, or to allow simultaneous reception of multi-user transmissions by a receiver. This can be called PM-LP-OFMDA (phase modulated-linear precoded-orthogonal frequency division multiple access).

11 Claims, 19 Drawing Sheets

Fig. 12A

```cpp
//ROFDMA.CPP an analytical signal rotates phase on a carrier.
#include <math.h>
#include <stdio.h>
#include <stdlib.h>
#include <malloc.h>
#include <time.h>
typedef struct {float real, imag;} COMPLEX;
extern void fft(COMPLEX *,int);
extern void ifft(COMPLEX *,int);

int main()
{
        COMPLEX *w, *x, *y;
        w=(COMPLEX*) calloc(4096, sizeof(COMPLEX));
        if(!w){printf("\n Unable to allocate input memory.\n");printf("\x7");exit(1);};
        x=(COMPLEX*) calloc(4096, sizeof(COMPLEX));
        if(!x){printf("\n Unable to allocate input memory.\n");printf("\x7");exit(1);};
        y=(COMPLEX*) calloc(4096, sizeof(COMPLEX));
        if(!y){printf("\n Unable to allocate input memory.\n");printf("\x7");exit(1);};
        FILE *output;
        int i, rr[2048], ri[2048], window = 1;
        float nf, mag[2048], ang[2048], k=40; //k is rotational multiplier
if( (output = fopen("output.txt", "w") ) == NULL){   //write results to a file
        printf("could not open file.\n");system("pause");exit(0);
}
fprintf(output,"k= %f\tnf= %f\twindow= %d\n",k,nf,window);
srand(5);//initialize randomizer
 for(i=16;i<128;i++){//populate partial band
        rr[i] = rand() % 2;
        ri[i] = rand() % 2;
        w[i].real = (float)rr[i]*2 -1;
        w[i].imag = (float)ri[i]*2 -1;
 }
for(i=1;i<512;i++){  //make complex conjugates
        w[1024-i].real = w[i].real;
        w[1024-i].imag = -w[i].imag;
}//in FD, half of points are complex conjugates
ifft(w,10); //signal now in time domain, imag. values are all 0s
//now map real-only sequence to rotary projection
for(i=0;i<1024;i++){  //x is in TD, phase modulation occurs here
        x[i].real = + cos(k*w[i].real);   //source of a large DC term, note 0,0 in center for const amplitude
```

Fig. 12B

```
        x[i].imag = sin(k*w[i].real);
        mag[i] = sqrt(x[i].real*x[i].real + x[i].imag * x[i].imag);
        ang[i] = atan2(x[i].imag,x[i].real);
        fprintf(output,"A %d\t%f\t%f\t%f\t%f\t%f\n",i,w[i].real, w[i].imag,
x[i].real,x[i].imag,mag[i],ang[i]);//plot ang
}
fft(x,10);//make plots in the freq domain
//now lets optionally truncate higher order signal energy
if(window == 1){
        for(i=256;i<1024-256;i++){
                x[i].real = .001;// dont make 0 for plotting with log scale
                x[i].imag = .001;
        }
}
for(i=512;i<1024;i++){
        mag[i] = sqrt(x[i].real*x[i].real + x[i].imag * x[i].imag);
        ang[i] = atan2(x[i].imag,x[i].real);     //mag vs freq is interesting variable
        fprintf(output,"B %d\t%f\t%f\t%f\t%f\n",i,x[i].real,x[i].imag,mag[i],ang[i]);
}
for(i=0;i<512;i++){
        mag[i] = sqrt(x[i].real*x[i].real + x[i].imag * x[i].imag);
        ang[i] = atan2(x[i].imag,x[i].real);               //mag vs freq is interesting variable
        fprintf(output,"C %d\t%f\t%f\t%f\t%f\n",i,x[i].real,x[i].imag,mag[i],ang[i]);
}
ifft(x,10);  //x is back into TD
//now transmit and receive the signal, optionally add noise here
//now receive said signal
for(i=0;i<1024;i++){
        ang[i] = atan2(x[i].imag,x[i].real);
        mag[i] = sqrt(x[i].real*x[i].real + x[i].imag * x[i].imag);
        fprintf(output,"D %d\t%f\t%f\t%f\t%f\n",i,x[i].real,x[i].imag,ang[i],mag[i]);
        y[i].real = ang[i];//note this acts like a limiter after windowing
        y[i].imag = 0;
}
fft(y,10);
for(i=0;i<1024;i++){
        mag[i] = sqrt(y[i].real*y[i].real + y[i].imag * y[i].imag);
            fprintf(output,"E %d\t%f\t%f\t%f\n",i,y[i].real,y[i].imag,mag[i]);
}
return(0);
}
```

Fig. 13A

```c
#include <math.h>
#include <stdio.h>
#include <stdlib.h>
typedef struct {float real, imag;} COMPLEX;
extern void fft(COMPLEX *,int);
extern void ifft(COMPLEX *,int);
int main()
{
        COMPLEX *v, *w, *x, *y, *n;
        n=(COMPLEX*) calloc(4096, sizeof(COMPLEX));
        if(!n){printf("\n Unable to allocate input memory.\n");printf("\x7");exit(1);};
        v=(COMPLEX*) calloc(4096, sizeof(COMPLEX));
        if(!v){printf("\n Unable to allocate input memory.\n");printf("\x7");exit(1);};
        w=(COMPLEX*) calloc(4096, sizeof(COMPLEX));
        if(!w){printf("\n Unable to allocate input memory.\n");printf("\x7");exit(1);};
        x=(COMPLEX*) calloc(4096, sizeof(COMPLEX));
        if(!x){printf("\n Unable to allocate input memory.\n");printf("\x7");exit(1);};
        y=(COMPLEX*) calloc(4096, sizeof(COMPLEX));
        if(!y){printf("\n Unable to allocate input memory.\n");printf("\x7");exit(1);};
        FILE *output;
        int i,rr[2048],ri[2048],window = 1;
        float mag[2048],ang[2048], k=5; //k is rotational multiplier
if( (output = fopen("output.txt", "w") ) == NULL){ //write results to a file
        printf("could not open file.\n");    system("pause");    exit(0); }
srand(5);//initalize randomizer
for(i=0;i<128;i++){//partial band
        rr[i] = rand() % 2;
        ri[i] = rand() % 2;
        w[i].real = (float)rr[i]*2 -1;
        w[i].imag = (float)ri[i]*2 -1;
}
fft(w,7); //now in FD
for(i=0;i<128;i++){//freq shift up 10
        x[i+10].real = w[i].real;
        x[i+10].imag = w[i].imag;
}
```

Fig. 13B

```
        v[i].real = + cos(k*x[i].real);   //source of a large DC term, note 0,0 in center
        v[i].imag = sin(k*x[i].real);
        mag[i] = sqrt(v[i].real*v[i].real + v[i].imag * v[i].imag);
        ang[i] = atan2(v[i].imag,v[i].real);
        fprintf(output,"B %d\t%f\t%f\t%f\t%f\n",i,v[i].real,v[i].imag,mag[i],ang[i]);//plot ang
}
fft(v,10);//view data in the freq domain
if(window == 1){// optionally truncate spectrum, noise and signal
        for(i=256;i<1024-256;i++){
                v[i].real = .001;// dont make 0 for plotting appearance
                v[i].imag = .001;
        }
}
for(i=512;i<1024;i++){//spectral plot
        mag[i] = sqrt(v[i].real*v[i].real + v[i].imag * v[i].imag);
        ang[i] = atan2(v[i].imag,v[i].real);          //mag vs freq is interesting variable
        fprintf(output,"C %f\t%f\t%f\t%f\n",i,v[i].real,v[i].imag,mag[i],ang[i]);
}
for(i=0;i<512;i++){
        mag[i] = sqrt(v[i].real*v[i].real + v[i].imag * v[i].imag);
        ang[i] = atan2(v[i].imag,v[i].real);          //mag vs freq is interesting variable
        fprintf(output,"D %d\t%f\t%f\t%f\t%f\n",i,v[i].real,v[i].imag,mag[i],ang[i]);
}
ifft(v,10);  //back into TD
//modulate, transmit, receive
//start receiver
for(i=0;i<1024;i++){
        ang[i] = atan2(v[i].imag,v[i].real);
        mag[i] = sqrt(v[i].real*v[i].real + v[i].imag * v[i].imag);
        fprintf(output,"E %d\t%f\t%f\t%f\t%f\n",i,v[i].real,v[i].imag,ang[i],mag[i]);
        y[i].real = ang[i];//note this acts like a limiter after windowing
        y[i].imag = 0;
}
fft(y,10);
for(i=0;i<1024;i++){
        mag[i] = sqrt(y[i].real*y[i].real + y[i].imag * y[i].imag);
        fprintf(output,"F %d\t%f\t%f\t%f\n",i,y[i].real,y[i].imag,mag[i]);
}
for(i=0;i<128;i++){
        n[i].real = y[i+10].real;
        n[i].imag = y[i+10].imag;
}
ifft(n,7);
for(i=0;i<128;i++){
        mag[i] = sqrt(n[i].real*n[i].real + n[i].imag * n[i].imag);
        fprintf(output,"G %d\t%f\t%f\t%f\n",i,n[i].real,n[i].imag,mag[i]);
}
return(0); }
```

DIGITAL TRANSMISSION SYSTEMS USING TRANSFORMED PHASE MODULATED SIGNALS (PM-OFDM)

CROSS REFERENCE TO RELATED APPLICATIONS

None.

FIELD

This invention relates to data communications systems and digital two-way communications systems in general.

BACKGROUND

Claude Shannon's classic 1947 paper on "Communications in the Presence of Noise" is used for background. A traditional challenge for communications engineers is to design a system that is bandwidth efficient. That is, the maximum number of bits per Hertz of occupied bandwidth is achieved with some level of background random noise and with a transmitted power limitation. This is a reasonable goal when many transmitters are in close proximity, bandwidth is limited or expensive, and users' transmitted signals propagate in all directions. An example of the former is wireless transmission using omni-directional dipole antennas. An example of the latter is coaxial cable transmissions where the cable's loss increases with frequency and signal boosting amplifiers have limited dynamic range. The use of energy-inefficient class-A amplifiers causes a power penalty in generating and boosting these bandwidth-efficient signals. If remote units are battery powered, high power consumption shortens battery life.

However, other applications exist where the bandwidth is not in such short supply, or the direction of signal propagation can be controlled. Examples of the former are fiber optic cables with enormous bandwidth while an example of the latter is millimeter wave microwave systems with narrow pencil beams and high gain antennas. Saturated class C amplifiers are more power efficient than linear class A amplifiers at converting power supply energy into radio frequency (RF) energy. Another application where bandwidth efficiency is less important is Rural Broadband, which is internet service delivery outside of urban areas that are congested with radio signals. In rural broadband applications attenuation may be large due to distances or foliage.

Two categories of linear modulation systems are single-carrier and multi-carrier. Two examples of single-carrier modulated signals are QAM (quadrature amplitude modulation) and VSB (vestigial side-band). QAM systems operate by changing the magnitude and phase of a carrier. Multi-carrier signals are comprised of an integer number of harmonically-related orthogonal subcarriers. Two examples of multi-carrier systems are OFDM (A) and LP-OFDMA. OFDM (orthogonal frequency division modulation) was invented by Saltzburg and Chen of Bell Labs in the 1960s and a first patent describing OFDMA (orthogonal frequency division multiple access) was granted in 1998 (U.S. Pat. No. 5,815,488, although it was initially labeled multi-user OFDM). Linear precoded OFDMA (LP-OFDMA) is also known as SC-FDMA (single carrier-frequency division multiple access). SC-FDMA is the key technique of the up-link in the long-term evolution (LTE) standard.

Frequency modulation (FM) is a nonlinear modulation technique that was pioneered by E. Howard Armstrong and is less bandwidth efficient for data transmission than linear single carrier QAM or multi-carrier OFDM (A) signals, but power generation efficiency is better. A related transmission system is phase modulation (PM). Both FM and PM transmission techniques are non-linear modulation methods, while the QAM and OFDM transmissions are generally linear. A distinguishing feature of non-linear transmissions is the increase of radio frequency bandwidth of a modulator's output signal relative to a baseband input signal applied to the modulator. FM and PM signals are less bandwidth efficient because of sidebands generated by nonlinear distortion inherent in the phase modulation technique.

One of the challenges associated with coherent optics and millimeter wave reception is the recovery of a CW signal to be used for demodulation. This can be assisted with a CW signal embedded in the transmission.

In addition to power consumption, low implementation cost to build transmission systems is also important. Digital signal processing techniques have become the norm due to reduced computation cost as a result of Moore's law.

SUMMARY OF THE INVENTION

A block phase modulation technique is described where a complex input sequence of symbols with coefficients is transformed by an inverse Fourier or other transform producing a real-only output sequence. The real-only output signal is applied to a phase modulator, producing a phase modulated block with a constant amplitude output level which may be boosted with a power amplifier and transmitted. After reception, phase and frequency recovery can be done using a high power CW component of a received signal as a phase/frequency reference, and equalization is performed. The received signal's phase is recovered using a phase discriminator, or the phase can be recovered using an arc tangent function performed on the In-phase and Quadrature components of the received signal. The recovered phase angle vs. time sequence is processed with an opposite transform (un-transformed), recreating a copy of the transmitter's complex valued signal. The data are sliced along decision boundaries, and the resulting symbols are converted to bits. The modulating baseband signal can be precoded.

The bandwidth can be truncated to allow multiple remote units to transmit at a same time using different blocks of subcarriers assigned to mutually exclusive RF subcarrier frequencies without interference.

DESCRIPTION OF FIGURES

FIG. 12A is C code listing for the PM-OFDM (A) modulation.

FIG. 12B is a continuation of FIG. 12A.

FIG. 13A is C code listing for the PM-LP-OFDM modulation.

FIG. 13B is a continuation of FIG. 13A.

DESCRIPTION FIG. 1

Figure 1:
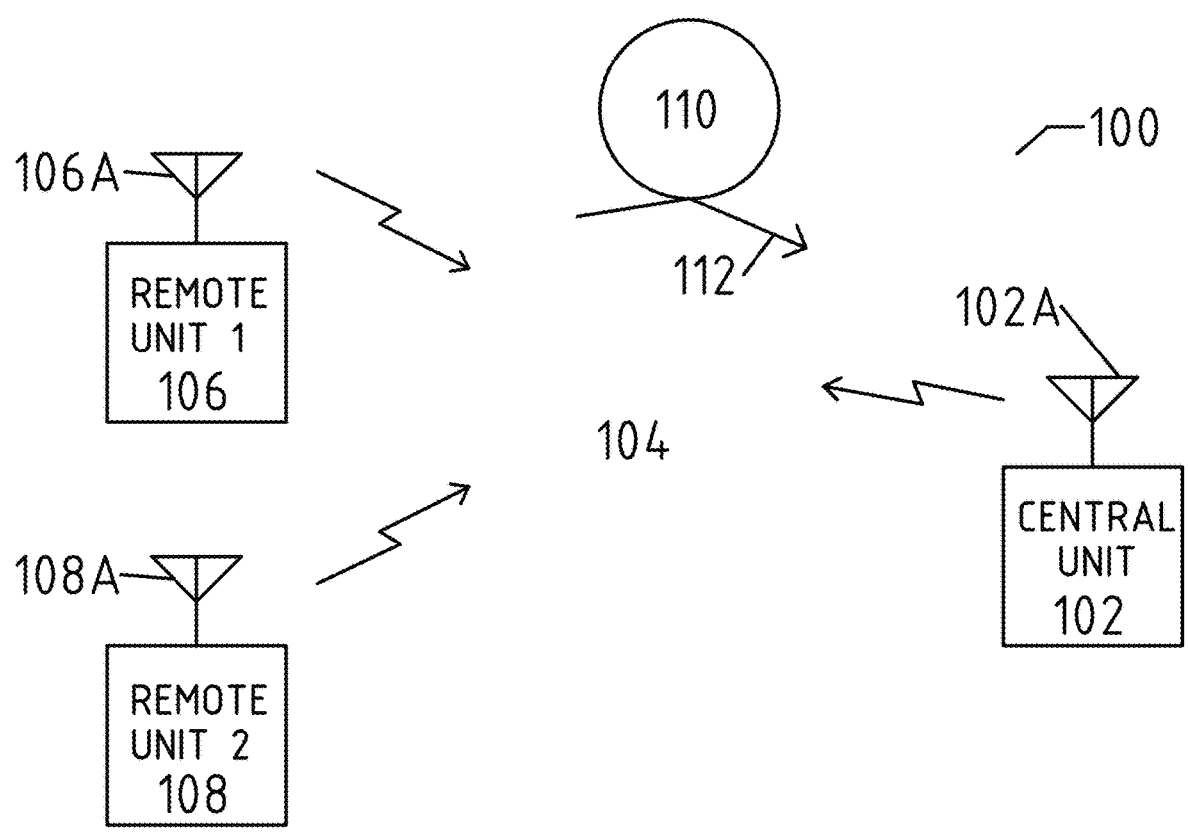
FIG. 1 is a block diagram of a transmission system with a central unit and a pair of remote units.

FIG. 1 is a block diagram 100 of a data transmission system with a central unit 102 and a pair of remote units, remote unit 106 and remote unit 108. The central unit 102, which provides two-way data for remote units, may be connected to the Internet or other communications system. The central unit can be a Wi-Fi access point or located at a cell tower location. A transmission medium 104 is illustrated as wireless or air. Other mediums can be wired, using metallic cable, wave-guide, or fiber optic cable. Central transceiver unit 102 uses antenna 102A, and a first remote transceiver unit 106 uses antenna 106A. A second remote transceiver unit 108 uses antenna 108A. Both remote units and the central unit can transmit at the same time using FDM (frequency division multiplexing) using different frequency bands or transmit at different times use TDM (time division multiplexing) in a same frequency band. Additionally, the two remote units can transmit at a same time without signal interference at a central unit receiver by using orthogonal carrier blocks with non-overlapping subcarriers, assigned by the central unit 102. A delayed copy 112 of a transmitted signal is reflected off of an object 110, such as a water tower. This delayed copy 112 can be combined with a received signal that took a direct path. Delayed signals are linear distortions, also known as echoes, multi-path, or ghosts. Other linear distortions are group delay, and amplitude tilt. Linear distortions can be eliminated with linear adaptive equalizers. Both transmitted and received signals may alternately use multiple antennas in a technique known as MIMO (multiple input, multiple output).

This modulation/demodulation technique is also suited for point-to-point wired and wireless links as well as for broadcast.

Figure 2:
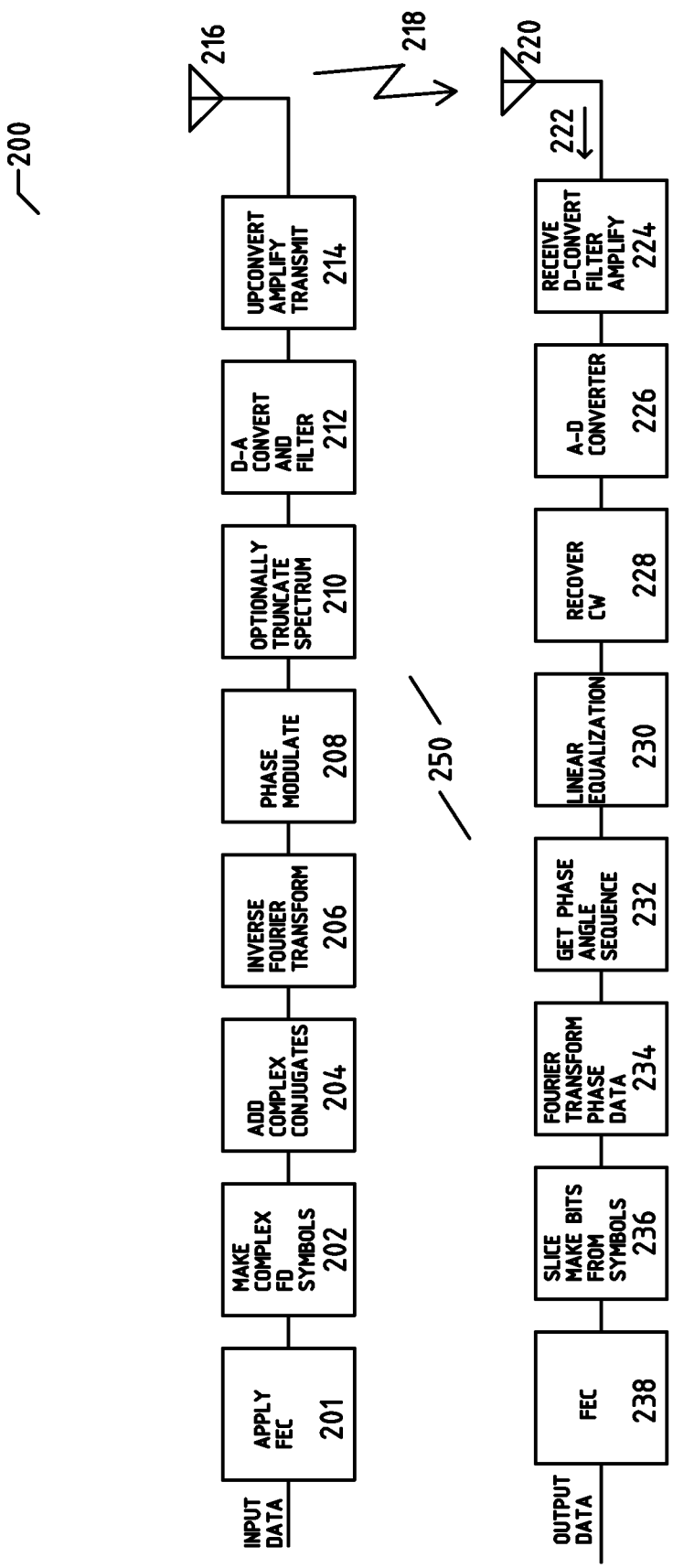
FIG. 2 is a block diagram of processing steps for a PM-OFDM block transmission system.

FIG. 2 is a block diagram 200 of processing steps for a PM-OFDM (A) transmission system 250 comprised of a transmitter on top and a receiver on bottom. In a step 201, forward error correction (FEC) is optionally applied to input data. In a step 202. (optionally FEC protected) input data bits are formed into complex I-Q (In-phase and Quadrature) symbols comprising an input baseband symbol sequence to be transformed. These symbols have values and can also be called "coefficients". In a step 204, complex conjugate values are added to the input baseband symbol sequence making a double-length input baseband symbol sequence. Adding complex conjugate values converts the double-length input baseband symbol sequence into a real-only phase angle sequence after an inverse Fourier transform is performed in a step 206. This symbol arrangement is also known as Hermitian symmetry. Each unique input baseband symbol may contain one or more bits of data. Optionally, the low numbered subcarriers in the input sequence will be situated around the center frequency and can be set to zero to facilitate carrier recovery at a receiver. In a step 208, the transformed real-only phase angle sequence is used to modulate the phase of a radio frequency (RF) or intermediate frequency (IF) carrier to create a PM subcarrier block. Positive values cause the phase to rotate in one direction and negative values cause the phase to rotate in an opposite direction, where the number of radians is proportional to the real-only symbol's value. The amount of phase deviation caused by a transformed symbol's value has a "k" factor, which can be adjustable. Using a high k factor results in a larger occupied signal bandwidth, but also improved signal to noise ratio for recovered symbols at the receiver. Upper and lower sidebands have similar shaped spectrums because of phase modulation. There is a large continuous wave (CW) component in the transmitted signal as a result of the phase deviating above and below zero degrees. As the value of k increases, energy moves from the CW component into the sidebands (subcarriers). The probability distribution function (PDF) of the phase angle samples reflects the transformed real-only modulating OFDM signal, and generally has approximately Gaussian distribution.

In a step 210, a portion of the resulting PM subcarrier block can optionally be symmetrically truncated, reducing slightly the power of the output signal and creating a truncated PM subcarrier block. Truncation causes the output signal's phasor diagram to deviate from a perfect circle but, if truncated energy comprises lower amplitude high frequencies, resulting amplitude modulation can be made small or negligible. Truncation is accomplished by taking the phase modulated subcarrier block into the frequency domain with a FFT, removing sideband energy by making subcarrier coefficients zero (null), and then taking the resulting spectrum truncated phase-modulated subcarrier block back into the time domain. In a step. 212 an (approximately) constant-amplitude signal is converted into analog form with a D-A (digital to analog) converter and filtered to remove aliasing components. In a step 212, a cyclic prefix can be optionally added in the time domain to assist demodulation. Cyclic prefixes are created by cutting a number of symbols from the end of a transform block and pasting them onto the front of a transform block. In a step 214, a transmitted signal 218 is up converted, amplified, and transmitted using a transmit antenna 216 into a medium. The central unit 102 provided the assigned radio frequency band which is comprised of an integer number of subcarriers. The transmit antenna 216 and a receive antenna 220 are used to illustrate a wireless signal path, but this modulation technique works for any transmission medium.

After reception of the transmitted signal 218 by the receive antenna 220, a received signal 222 is applied in a step 224 to a receiver block which down converts, amplifies and filters the received signal 222. In a step 226, the analog RF signal is converted to digital format with an A-D (analog-to-digital) converter. The signal may be in baseband I-Q format, or as a down converted IF (intermediate frequency) signal. If it is an IF signal, the I signal can be obtained by multiplying the IF signal by cos (wt) and the Q signal can be obtained multiplying the IF signal by sin (wt), where w is the recovered carrier frequency and t is time. In a step 228, the continuous wave (CW) is extracted by filtering the IF signal. An angle of the recovered CW signal can be set to 0 degrees using a rotation matrix in the frequency domain. CW recovery was optionally improved by zeroing the subcarriers near (above and below) the CW frequency. In a step 230, the received signal is equalized to remove any linear distortion. Equalization coefficients can be computed by analyzing a training signal (not illustrated). A training signal made from a Zadoff Chu sequence can also be a constant amplitude signal that is periodically transmitted over a same signal path. In a step 232, a phase angle vs. time sequence is obtained. This can be accomplished by computing an arc tangent of the Q component voltage divided by the I component voltage. An alternative method is to use a discriminator, such as a Foster-Seeley discriminator, or a pulse count discriminator, to get an instantaneous frequency; and integrate the frequency to find the phase angle. In a step 234, phase angle vs. time sequence is converted back into the frequency domain with a Fourier transform (un-transform of transform in step 206). In a step 236, the symbols in a received baseband symbol sequence are sliced and symbols are converted into bits, and in a step 238, the data may optionally be forward error corrected. Finally, the data are output.

An alternate block diagram can be made using a SDR (software defined radio) and digital signal processing can be done with a FPGA (field programmable gate array), with a general purpose computer, a microprocessor or an ASIC (application specific integrated circuit) using read only memory (ROM) and random access memory (RAM).

The phase modulated OFDM signal is generated using both linear and non-linear signal processing techniques. The transform to convert frequency domain coefficients into time domain coefficients is linear. The process to phase modulate the carrier with the phase angle vs. time sequence being a set of time domain coefficients is nonlinear. The demodulation or phase discrimination (arctangent) process in the receiver is also nonlinear, canceling the nonlinear distortion that was created in the transmitter.

In mathematics, two functions are orthogonal if the integral of one basis function times another basis function over a time interval equals zero. In OFDM (A) modulation, the basis functions are integer multiples of sines and cosines. For phase modulated blocks:

$$\int_a^b f1(x) \times f2(x) dx = 0 \quad (1)$$

where f1(t) is one phase modulated signal (or block) and f2(t) is the other phase modulated signal (or block) that is orthogonal to f1(t). Between block time limits a and b, an integer number of cosine wave cycles of subcarriers occur. f1(t) and f2(t) may be referred to as blocks or transformed sequences.

f1(t) and f2(t) are both comprised of an integer number of cosine basis functions. However, within f1(t) subcarriers are not orthogonal to each other because of phase modulation, which can be viewed as a nonlinear function and modeled by a Taylor series. Within a linear OFDM (A) block, on the other hand, subcarriers are orthogonal because the IFFT transform making an OFDM (A) signal is a linear operator.

DESCRIPTION FIG. 3

Figure 3:
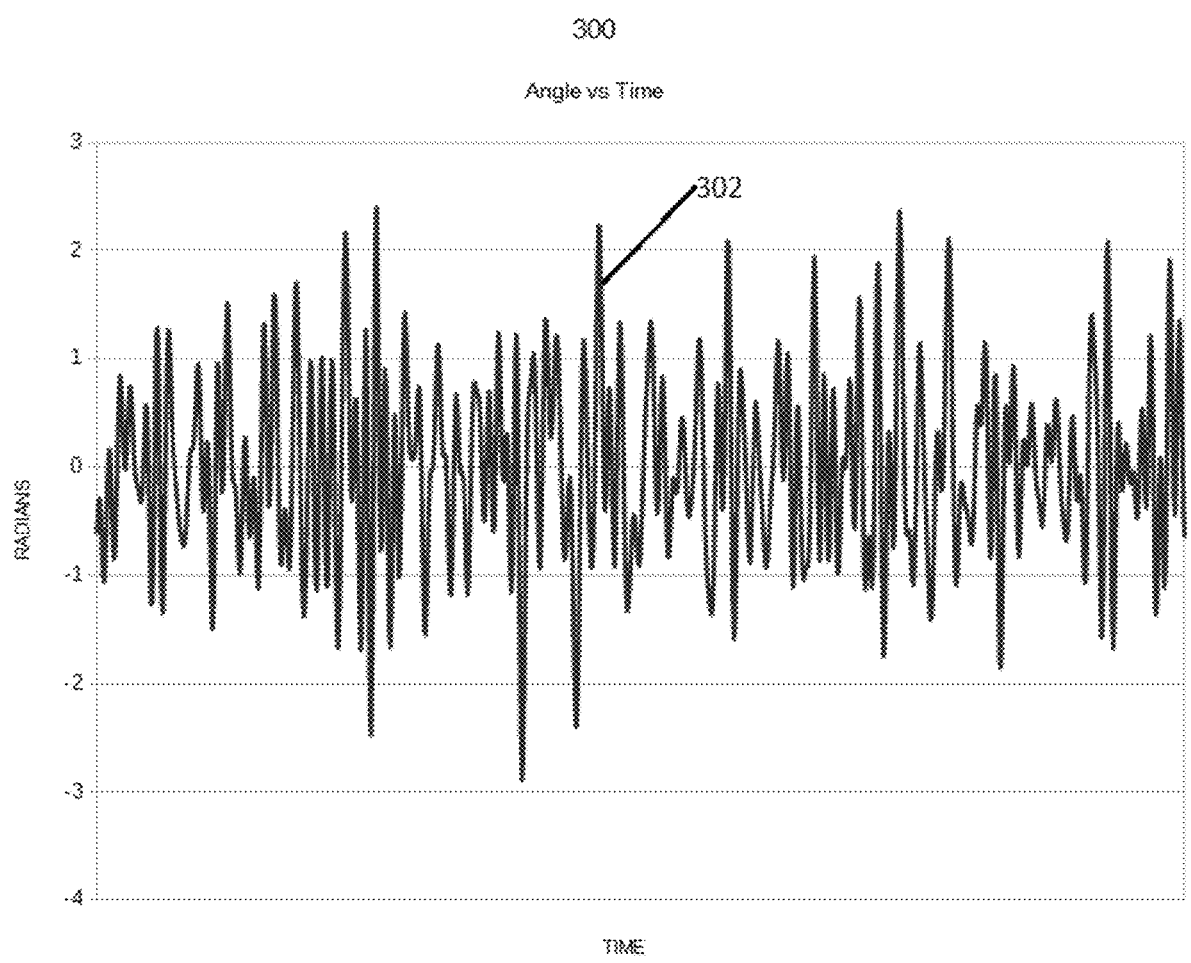
FIG. 3 is a plot of phase angle vs time for a PM-OFDM signal.

FIG. 3 is a plot 300 of phase angle vs. time for a PM-OFDM transmission system. This waveform 302 can be observed at the output of the phase modulator in step 208. The Y-axis of this plot is scaled in radians. At the input of the phase modulator, a waveform 302 will appear the same, except the Y-axis units will be in volts. Voltage at the input to step 208 and the phase angle at the output of step 208 in radians are related by the k factor as mentioned above.

Figure 4A:
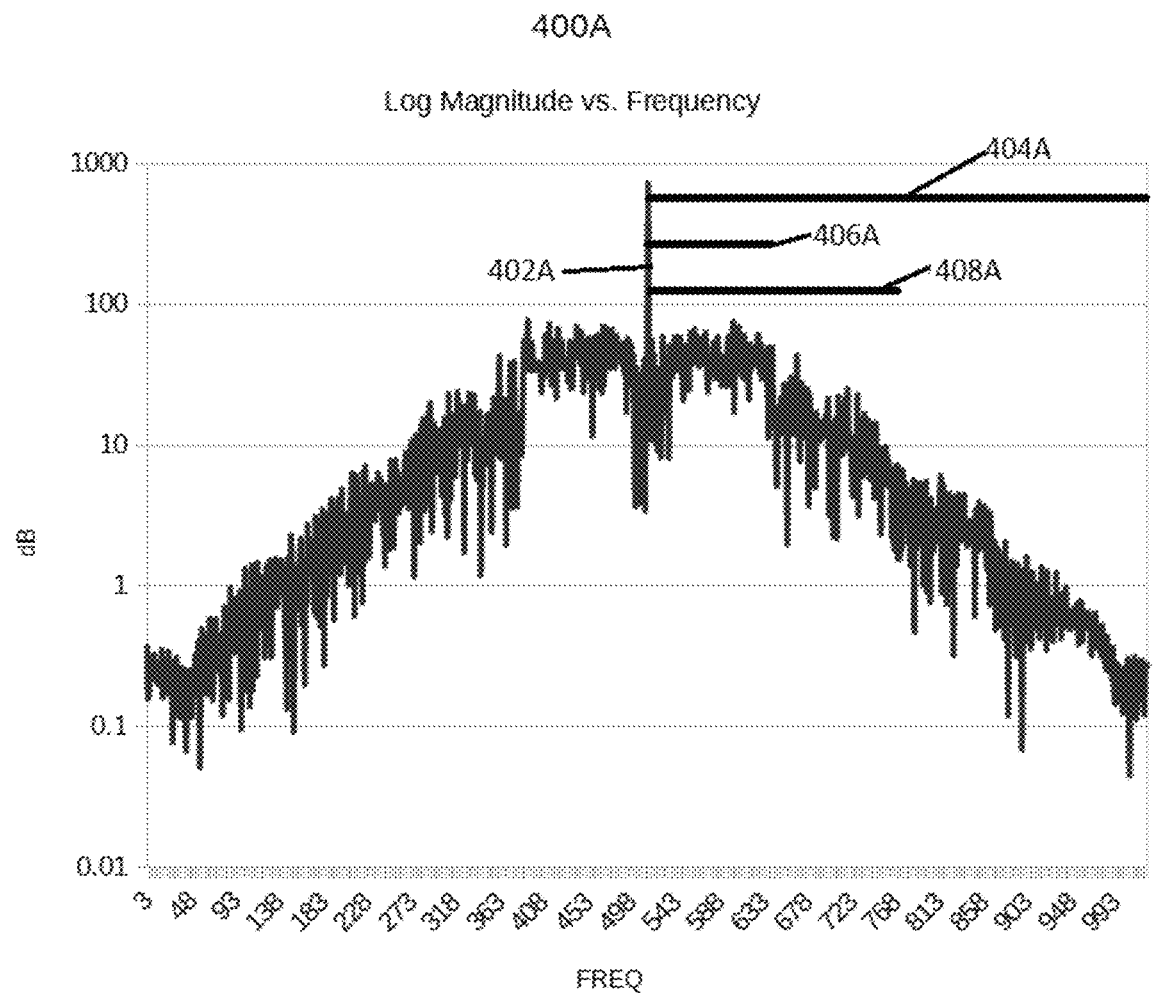
FIG. 4A is a spectral diagram of a PM-OFDM transmitted signal without spectrum truncation.

DESCRIPTION FIG. 4a

FIG. 4A is a spectral plot 400A of transmitted PM-OFDM signal without spectral truncation. This plot may be observed at the output step 208 and in the transmission medium. Notable on this plot are a CW component 402A, an upper sideband 404A, an approximate spectral band associated with the first harmonic of the baseband signal, 406A and an approximate spectral band 408A associated with a second harmonic of the modulating baseband signal. Null subcarriers have been inserted around the center frequency to assist CW recovery. Inserting null subcarriers around the CW will shift the distortion bands away from the center frequency. Generally PM sidebands are symmetrical, but severe linear distortion, such as from echoes, can disrupt this symmetry and must be canceled prior to demodulation. In the frequency domain, $2^{nd}$ order nonlinear distortion may be mathematically computed as a convolution of a spectrum with itself, and third order distortion is computed as a triple convolution of a spectrum with itself.

DESCRIPTION FIG. 4B

Figure 4B:
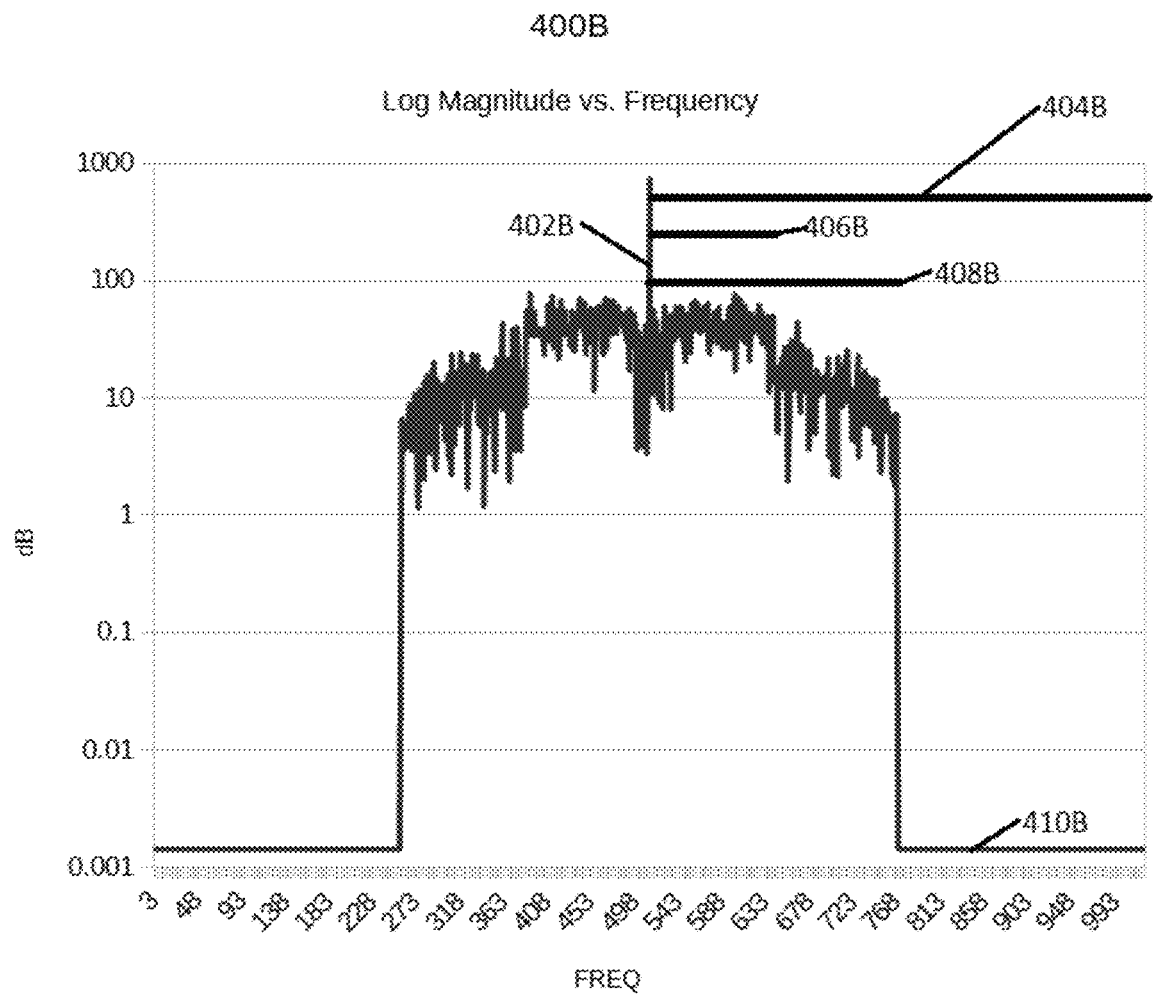
FIG. 4B is a spectral diagram of a PM-OFDM transmitted signal with spectrum truncation.

FIG. 4B is a spectral plot 400B of transmitted PM-OFDM signal with spectral truncation. Notable on this plot are a CW component 402B, an upper sideband 404B, a spectral band associated with the first harmonic of the baseband signal 406B, and a spectral band 408B associated with a second harmonic of the modulating baseband signal. Generally, PM upper and lower sidebands are symmetrical, but severe linear distortion from echoes can disrupt this symmetry and must be canceled prior to demodulation. Spectral truncation has been done in the frequency domain by inserting 0s for all frequency coefficients in a truncated upper sideband 410B as well as in a lower sideband. In the step 210 the time domain modulated signal can be converted into the frequency domain, have subcarriers symmetrically truncated, and then converted back into the time domain for power amplification and transmission. Note that FIG. 4 is a logarithmic plot, and the amount of power reduction from truncation can be a few percent or less.

Spectral truncation normally occurs at an integer number of subcarriers which is greater than the number of subcarriers in the baseband modulating signal. This makes a spectrum truncated signal that is orthogonal to other spectrum truncated signals. This allows such signals to be placed adjacent to each other in the frequency domain without interference and without using guard bands.

DESCRIPTION FIG. 5A

Figure 5A:
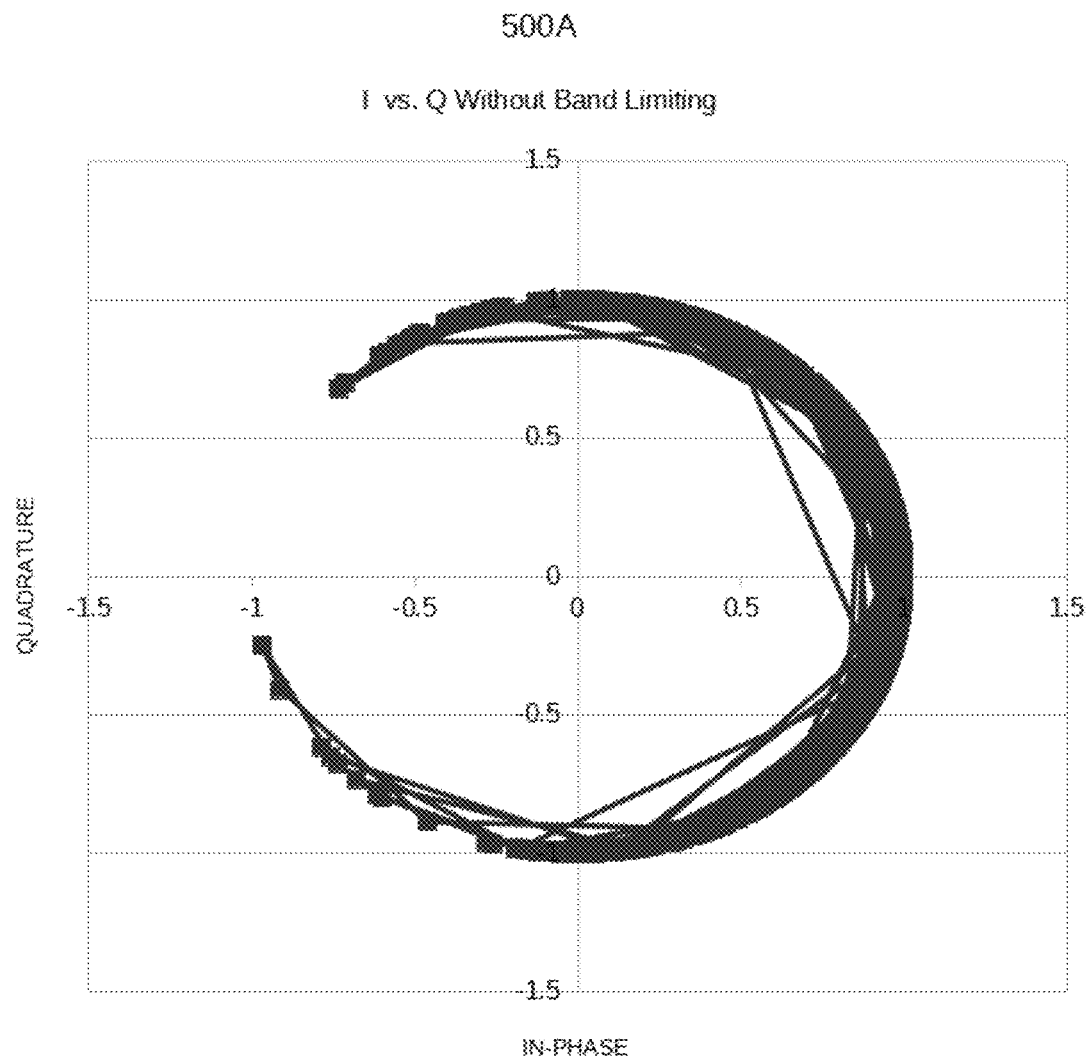
FIG. 5A is an I-Q vector diagram of an PM-OFDM transmitted signal without spectrum truncation.

FIG. 5A is an I-Q vector diagram plot 500A of an un-truncated PM-OFDM transmitted signal without spectrum truncation. This spectrum can be observed at the output of the phase modulator in step 208. Zero degrees is the point at which I is +1 and Q is 0. The selection of the k value limits phase deviation to prevent an instantaneous angle from deviating more than plus or minus PI radians (180 degrees). This is not a requirement, but phase must be tracked correctly as it crosses the plus or minus PI angle. Sampled data must meet Nyquist's sampling criteria to determine a trajectory of the phase angle. That is, the processor needs to know which path a phasor took. Ideally all time domain sample points are situated on a circle if they are free of noise and interference. All time domain I-Q sample points are illustrated as dots with straight lines between adjacent points, and all sample points are situated on a circle.

DESCRIPTION FIG. 5B

Figure 5B:
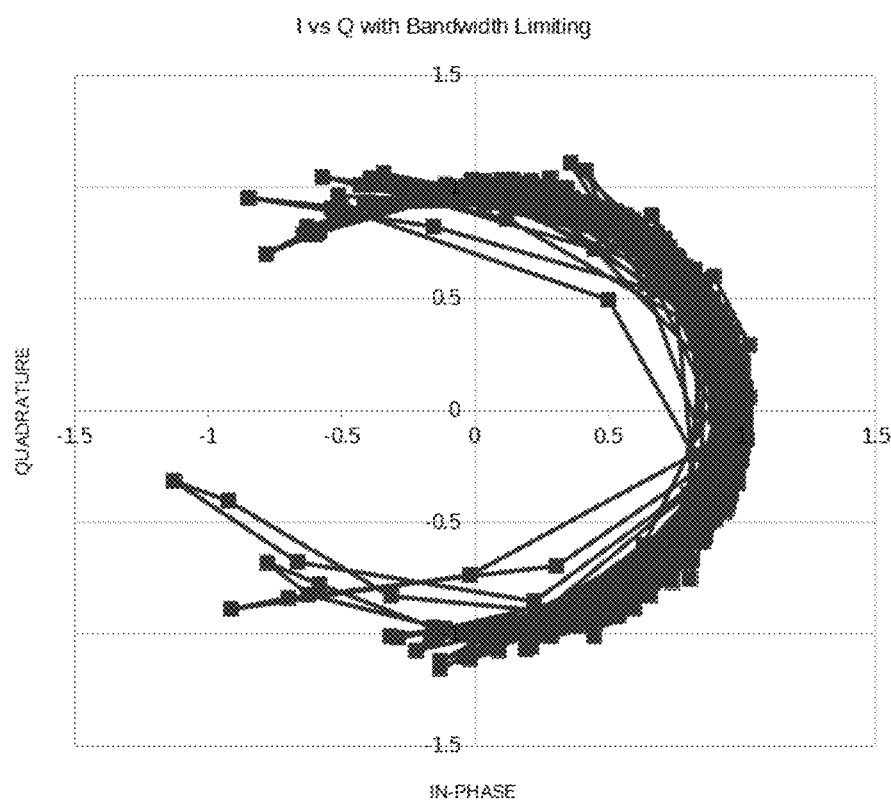
FIG. 5B is an I-Q vector diagram of an PM-OFDM transmitted signal with spectrum truncation.

FIG. 5B is an I-Q or vector diagram plot 500B of a transmitted signal PM-OFDM (A) with spectral truncation. This spectrum can be observed at the output of the spectrum truncation step 210. Ideally, all time domain sample points are situated on a circle. However, truncation has caused some of the time domain sample points to not fall on the unit circle. A recovered constellation diagram will have small errors caused by the truncation. The recovered angle, measured by the arc tangent, is the data utilized to estimate phase angle vs. time.

DESCRIPTION FIG. 6

Figure 6:
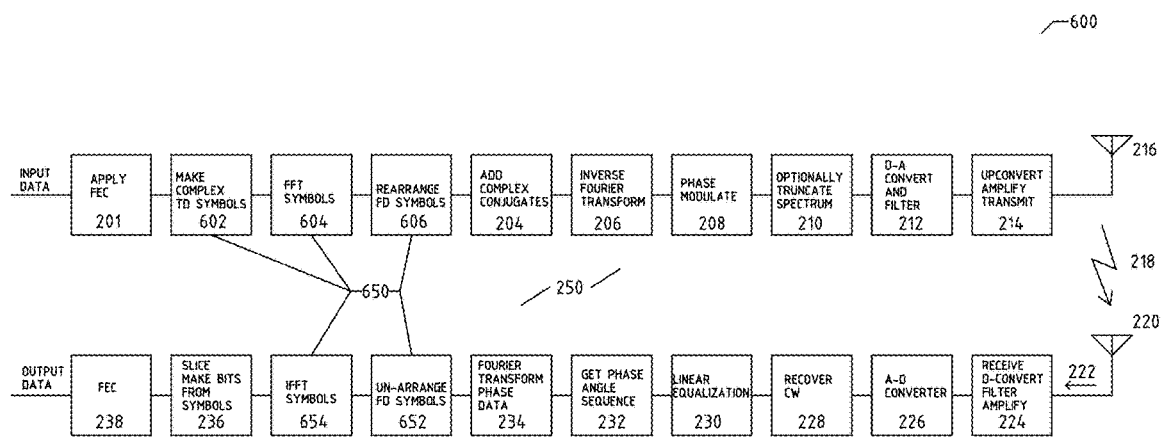
FIG. 6 is a block diagram of processing steps for a LP-PM-OFDM transmission system.

FIG. 6 is a block diagram 600 of processing steps for a LP-OFDM transmission system comprised of a transmitter on top and a receiver on bottom. This diagram is comparable to the diagram of FIG. 2, but with additional steps 650 added to achieve linear precoding (LP) transmission and reception. In a step 602, the series of input symbol coefficients are taken to be, or interpreted to be, time-domain symbols and are fast Fourier transformed in a step 604 to convert them into the frequency domain. In a step 606, frequency domain symbols can be rearranged in the frequency domain. In particular, they have been shifted up and down in frequency from the center to create a spectral hole just above and just below the CW coefficient located at the center. If the number of symbols in a block is not equal to two raised to an integer power, a DFT (discrete Fourier transform) can be used instead of a FFT, albeit with a computation penalty.

In receive a step 652, the received symbols are unarranged in the frequency domain back to their original order before rearranging. In a step 654, the sequence is transformed back into the time domain for slicing, recovering the original time sequence at the transmitter.

The motivation for adding linear precoding to this nonlinear transmission system is the same as for linear LP-OFDM (A), to reduce crest factor. In this case a goal is to reduce crest factor of the baseband phase modulation signal. That is, reduce peak angle excursion. LP also makes a system more tolerant to phase noise.

DESCRIPTION FIG. 7

Figure 7:
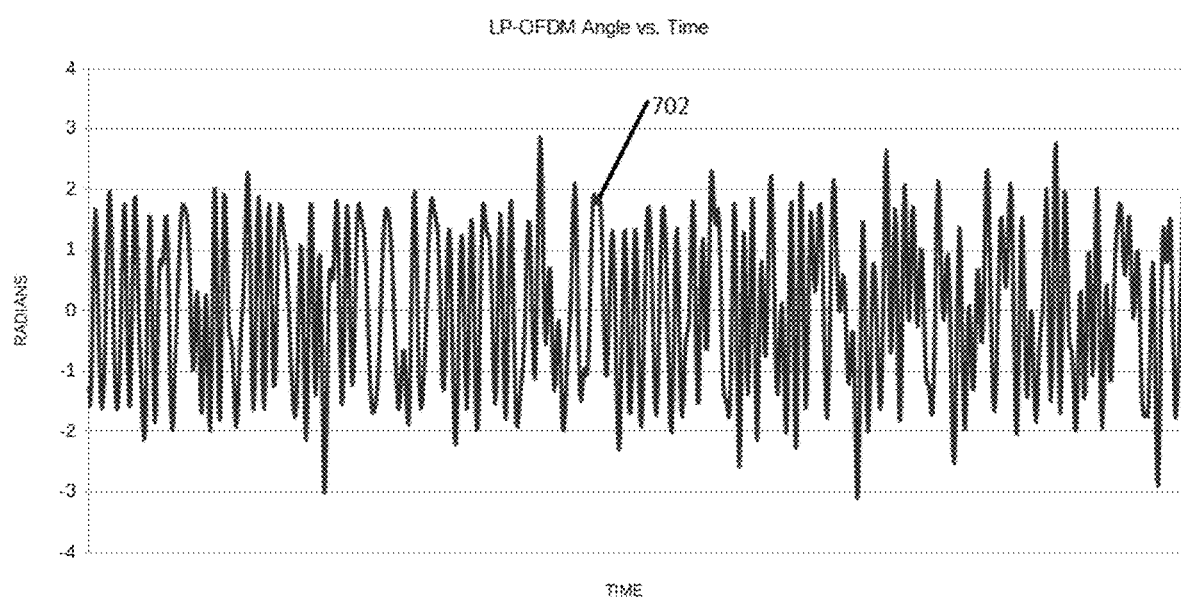
FIG. 7 is a plot of phase angle vs. time for an LP-PM-OFDM (A) signal.

FIG. 7 is a plot 700 of phase angle vs. time. This waveform 702 can be observed at the output of the phase modulator in step 208. The Y-axis of this plot is scaled in radians. At the input to the phase modulator step 208, a same waveform can be observed but with the Y-axis labeled in volts. As mentioned previously, voltage and radians are related by the k factor.

This plot can be compared to plot 300 which generally has a Gaussian voltage distribution. Since it was precoded, it should have a lower crest factor (peak to average ratio) relative to the non-precoded signal illustrated in FIG. 3

DESCRIPTION FIG. 8A

Figure 8A:
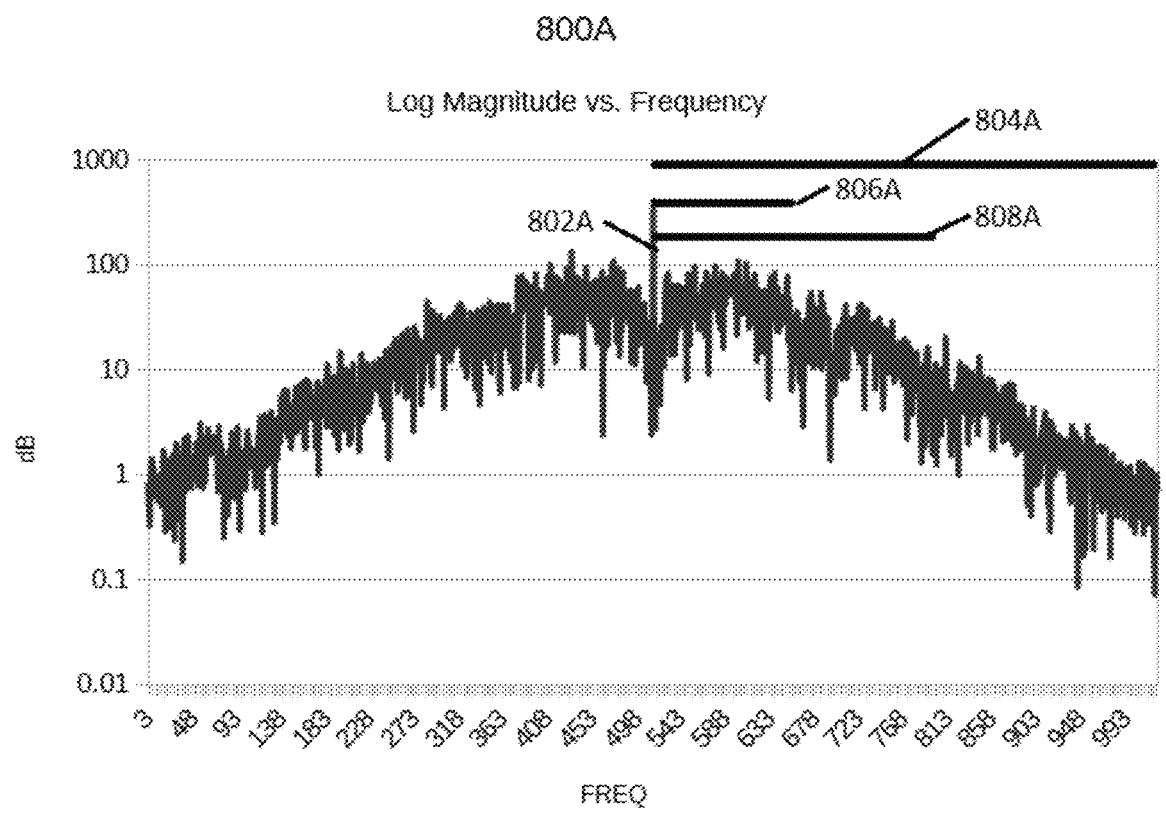
FIG. 8A is a spectral diagram of a LP-PM-OFDM (A) transmitted signal without spectrum truncation.

FIG. 8A is a spectral plot 800A of a PM-LP-OFDM transmitted signal without spectrum truncation, observed at the output of step 208 and in the transmission medium. Notable on this plot are a CW component 802A, an upper sideband 804A, an approximate spectral band associated with the first harmonic of the baseband signal, 806A and an approximate spectral band 808A associated with a second harmonic of the modulating baseband signal. Inserting null subcarriers around the CW will shift the distortion bands away from the center frequency. Generally, PM sidebands are symmetrical, but severe linear distortion can disrupt this symmetry and must be canceled prior to demodulation. In the frequency domain, $2^{nd}$ order nonlinear distortion may be mathematically computed as a convolution of a spectrum with itself.

DESCRIPTION FIG. 8B

Figure 8B:
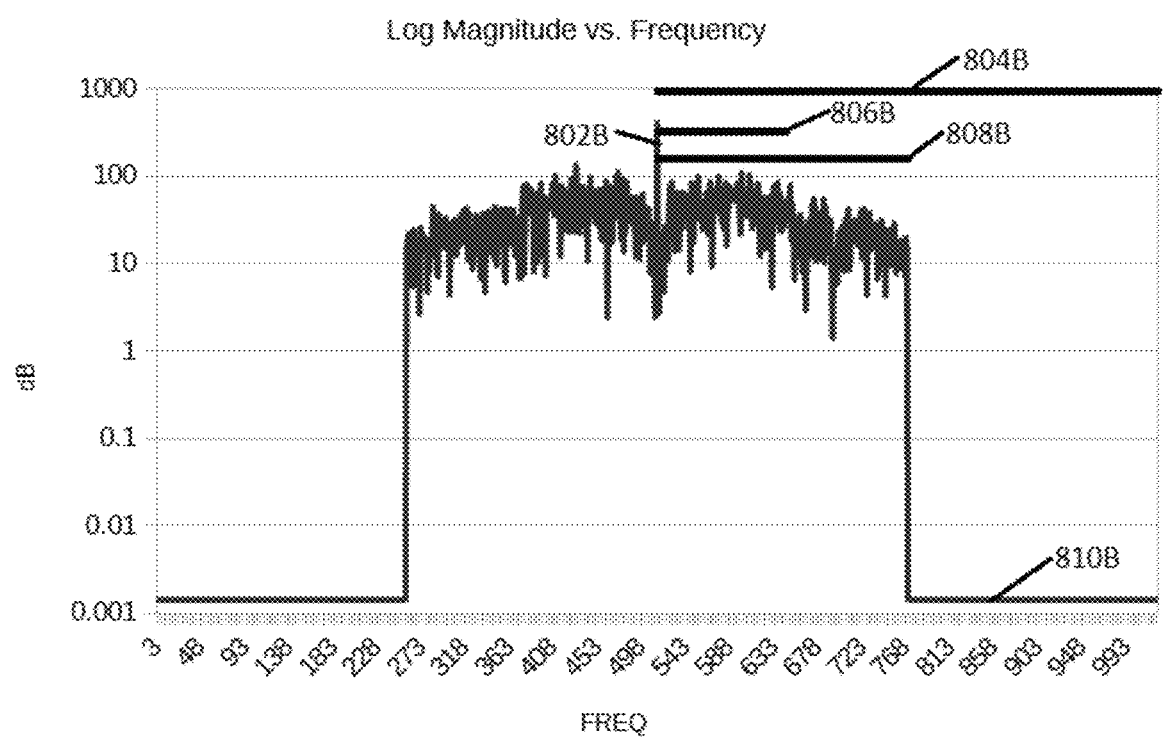
FIG. 8B is a spectral diagram of a LP-PM-OFDM (A) signal with spectrum truncation.

FIG. 8B is a spectral plot 800B of a PM-LP-OFDM (A) transmitted signal with spectral truncation. Notable on this plot are a CW component 802B, an upper sideband 804B, a spectral band associated with the first harmonic of the baseband signal 806B, and a spectral band 808B associated with a second harmonic of the modulating baseband signal. Generally PM upper and lower sidebands are symmetrical, but severe linear distortion can disrupt this symmetry and must be canceled prior to demodulation. Spectral truncation has been done in the frequency domain by inserting 0s for all frequency coefficients in a truncated upper sideband 810B as well as in a lower sideband. In the step 210, the time domain modulated signal can be converted into the frequency domain, have subcarriers symmetrically truncated, and then converted back into the time domain for power amplification and transmission. Note that this is a logarithmic plot, and the amount of power reduction from truncation can be a few percent or less.

Spectral truncation normally occurs at an integer number of subcarriers which is equal to or greater than the number of subcarriers in the baseband modulating signal. This makes a spectrum truncated PM-LP-OFDM (A) signal block that is orthogonal to other spectrum truncated signals. This allows such signals to be placed adjacent to each other without interference and without using guard bands.

DESCRIPTION FIG. 9A

Figure 9A:
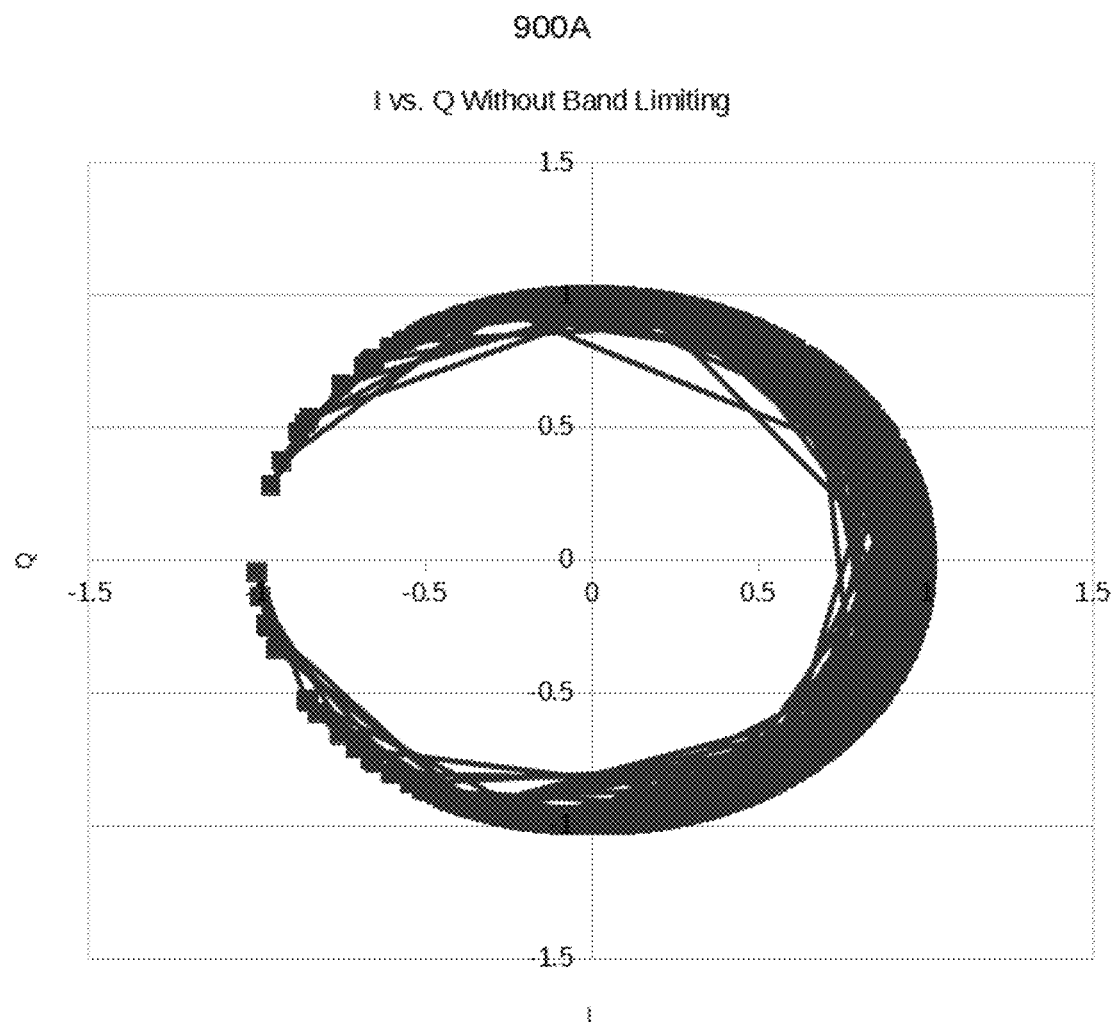
FIG. 9A is an I-Q vector diagram of a LP-PM-OFDM (A) transmitted signal without spectrum truncation.

FIG. 9A is an I-Q vector diagram plot 900A of a PM-LP-OFDM transmitted signal without spectrum truncation. If there is no noise or distortion, all sample points should lie on a circle.

DESCRIPTION FIG. 9B

Figure 9B:
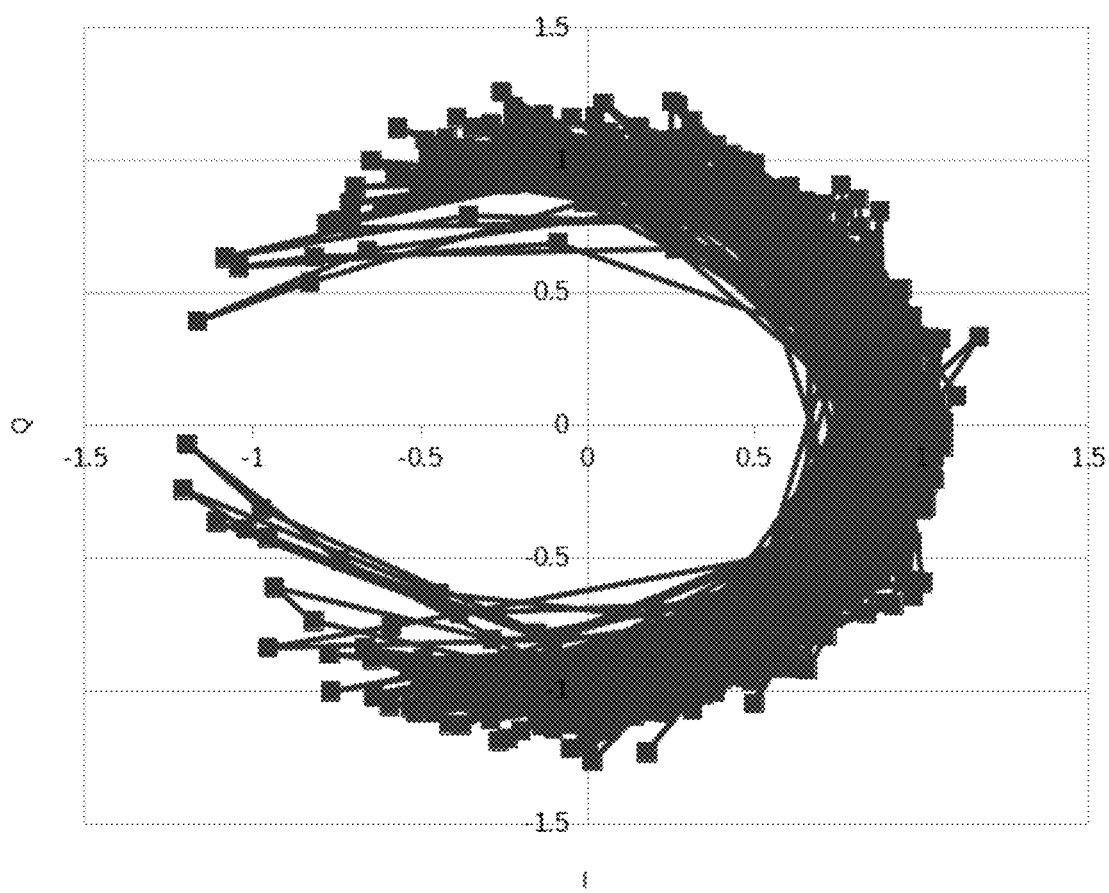
FIG. 9B is an I-Q vector diagram of a LP-PM-OFDM (A) transmitted signal with spectrum truncation.

FIG. 9B is an I-Q or vector diagram plot 900B of a PM-LP-OFDM (A) truncated signal which can be observed at the output of the spectrum truncation step 210. Ideally, all time domain sample points are situated on a circle. However, truncation has caused many of the time domain sample points to not fall on a unit circle. A recovered constellation diagram will have small errors caused by truncation. The recovered angle, measured by the arc tangent, is the data utilized to estimate phase angle vs. time.

DESCRIPTION FIG. 10

Figure 10:
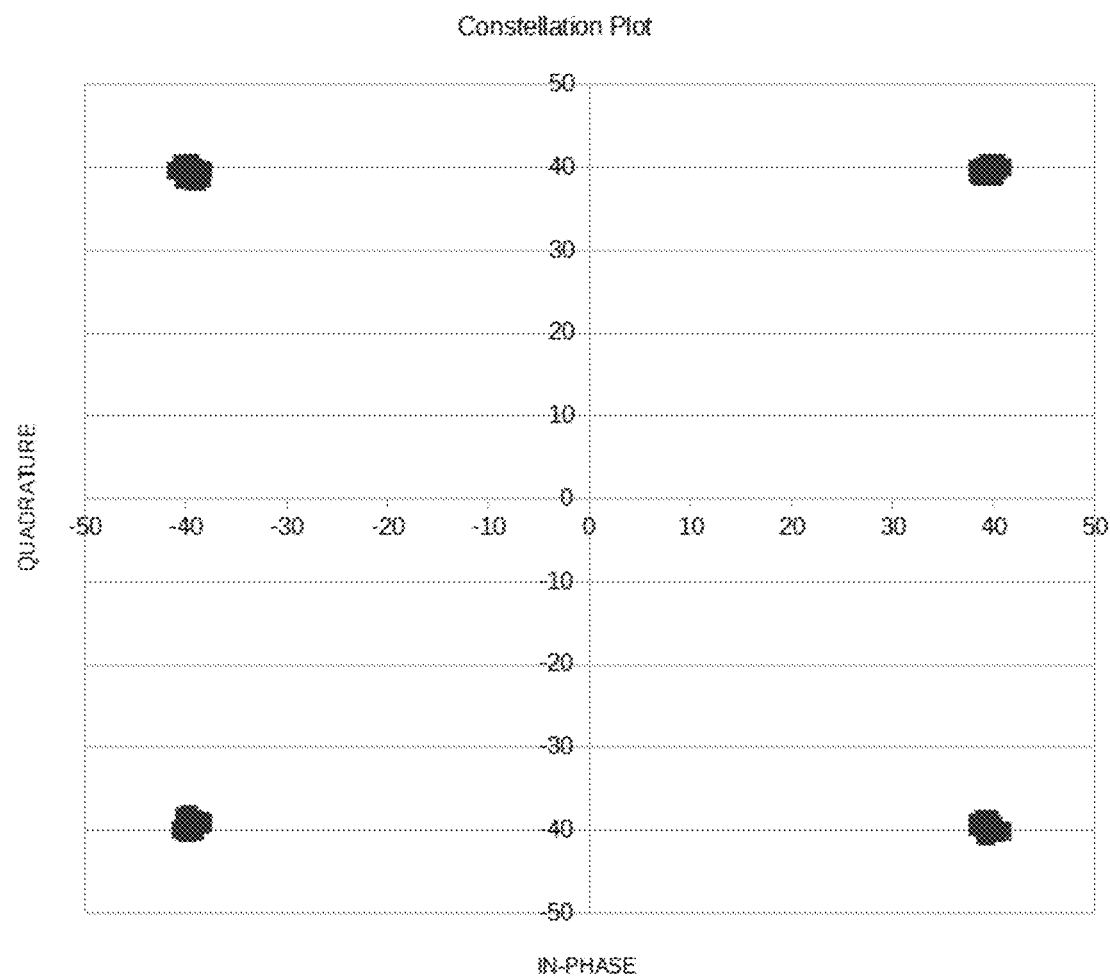
FIG. 10 is an I-Q constellation diagram of a received signal.

FIG. 10 is an I-Q PM-OFDM (A) constellation diagram of a received signal with spreading due to bandwidth truncation. Its modulation error ratio (MER) will be higher if more subcarriers are truncated, lower if less subcarriers are truncated.

DESCRIPTION FIG. 11

Figure 11:
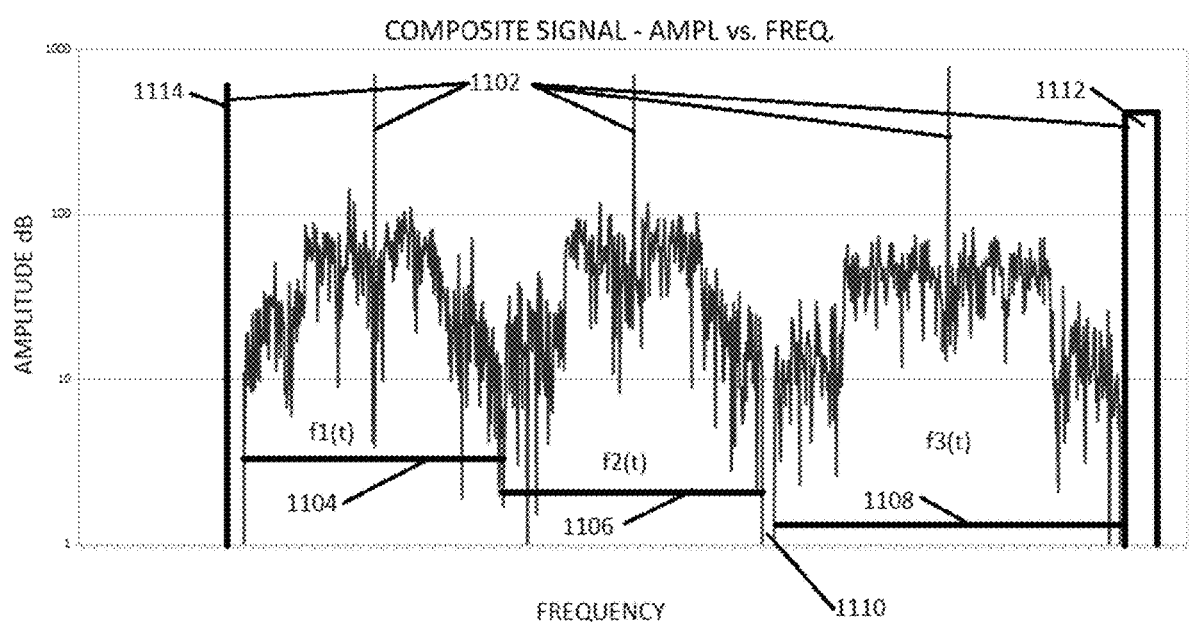
FIG. 11 is a spectral plot of five remote units transmitting on their assigned frequencies.

FIG. 11 is a spectral plot 1100 of five remote units transmitting on their assigned frequencies provided by the central unit 102. The central unit 102 assigned a first remote unit to use PM subcarriers in a band 1104 to transmit block f1(t), a second remote unit was assigned PM subcarriers in a band 1106 to transmit block f2(t), and a third remote unit was assigned PM subcarriers in a band 1108 to transmit block f3(t). Additionally, a fourth remote unit is transmitting a linear OFDMA signal 1112 in a block adjacent to band 1108. A fifth unit is transmitting a single subcarrier 1114. Subcarriers in a vacant band 1110 have not been assigned by the central unit. This may be because transmissions will cause interference with a licensed band, such as a CB radio or ISM band.

Together, a received composite signal 1102, comprised of signals coming from five remote units, is received and processed at the central receiver. All five units transmit their blocks beginning at the about a same time using mutually exclusive subcarriers to maintain orthogonality, and the blocks may contain cyclic prefixes. Transmissions f1(t) from a first remote unit, f2(t) from a second remote unit and f3(t) from a third remote unit all use spectrum truncation and are all orthogonal to each other and to signals 1112 and 1114. All three may be all PM-OFDM transmissions, or PM-LP-OFDM transmissions, or any mix of transmissions without loss of orthogonality. Each signal is orthogonal to all of the others because there is no overlap in occupied subcarriers and simultaneous transmissions.

Subcarriers within a PM-OFDM (A) or PM-LP-OFDM (A) blocks are not orthogonal to each other due to nonlinear modulation, but the blocks are orthogonal to each others and to signals 1112 and 1114.

Signal truncation eliminates intersymbol interference from band edges, albeit with a slight degradation in MER (modulation error ratio). A spectral plot of PM-LP-OFDM (A) has an approximately similar appearance to PM-OFDM (A) transmissions.

PM-OFDM (A) and PM-LP-OFDM (A) are fundamentally different than conventional linear OFDMA or SC-FDMA because the three blocks, comprised of groups of subcarriers, are orthogonal to each other. This is opposed to the individual subcarriers within a linear block that are also orthogonal to each other. As mentioned earlier, inside a phase modulated block, the individual subcarriers are not orthogonal to each other because of the nonlinear phase modulation. However, the individual blocks are orthogonal to each other. Additionally, PM-OFDM (A) and PM-LP-OFDM (A) use nonlinear PM, while OFDMA or SC-FDMA use linear modulation. Restated, PM-OFDM (A) and PM-LP-OFDM (A) are orthogonal block transmissions comprised of subcarriers that are not orthogonal to each other. OFDMA and SC-FDMA are orthogonal block transmissions comprised of subcarriers that are orthogonal to each other.

Essentially, subcarriers are assigned by radio frequencies (RF) and by numbers of subcarriers, setting occupied bandwidth. Different remote users can use different local oscillator (LO) frequencies to up-convert (mixing) their subcarrier sets (blocks) to the assigned set of frequencies.

DESCRIPTION FIGS. 12A-12B

FIG. 12A-12B is C code listing for the OFDM modulation. This code can be compiled with a GNU C compiler to generate numbers used in FIGS. 3-5 and 7-9. Comments are inline. An "output.txt" file is generated which is copied into a spreadsheet to generate plots.

DESCRIPTION FIGS. 13A-13B

FIGS. 13A-13B is C code listing for the LP-OFDM modulation.

Further Embodiments and Applications

1. Note that the spectrum truncated signals, for both the PM-OFDMA and PM-LP-OFDMA, can be transmitted by different users, in a method similar to OFDMA or SC-FDMA. The block transmissions from the remote users must be approximately time-aligned at the receiver in the central unit 102 and the blocks assigned to the remote units in the frequency domain do not overlap. There is not orthogonality between subcarriers inside a block, but there is orthogonality between individual blocks.
2. Not illustrated in the block diagrams of FIGS. 2 and 6 are the addition of cyclic prefixes. For continuous transmissions, cyclic prefixes, or cyclic extensions, or guard intervals are optional and may arguably be considered a waste of bandwidth. The signal processing to remove linear distortion, including echoes, can be done using an overlapped Fourier transform. For bursty or intermittent transmissions, dead air (quiet) times works in place of a cyclic prefix.
3. The common convention for OFDM is to use an IFFT at the transmitter and perform a FFT at the receiver. Note that the FFT and IFFT are very similar operations with only a scale factor difference (which can be normalized out) and a negative sign on the imaginary resulting coefficient with a FFT and a positive sign on an imaginary resulting coefficient with an IFFT. A FFT operation followed by an IFFT will recover the original sequence. A DFT gives an identical result as a FFT, albeit with more computational complexity. Signal processing for simulation used to generate the plots was done in C/C++. Transforms used in the C programs was taken from "C Language Algorithms for Digital Signal Processing" by Embree and Kimball. The term "un-transformed" indicates that the operation done by a "transformation" is undone.
4. A phase locked loop (PLL) can also be used to lock onto a received PM signal for receiver acquisition. The reduction of sideband energy in subcarriers near the CW improve phase lock acquisition and tracking.
5. It is expected that digital and computer technology using microprocessors, random access memory (RAM), read only memory (ROM), field programmable gate arrays (FPGA), custom ASICs (application specific integrated circuits), analog to digital (A-D) and digital to analog (D-A) circuits will be used to implement this invention.
6. Another particularly cheap and accurate method of phase modulation (PM) is to use direct digital synthesis (DDS) or numerically-controlled oscillators (NCOs). Consider the AD9835 integrated circuit from Analog Devices. Analog Devices is also a good reference source on programming such devices for phase and frequency control.
7. Other orthogonal transform, and their inverses (or un-transforms), can be used for rotation of the phase of a transmitted signal, including DCT (discrete cosine transform), wavelet transforms, Z-transforms, and Walsh-Hadamard transforms.

8. Another advantage of receiving a phase modulated signal is that large signal headroom on the analog-to-digital converter is not needed, as the peak to average (crest factor) signal power is 1.0. Note that this will not be the case if there is severe inter-symbol interference (ISI).

9. Injection locking can be used in place of amplification to produce a strong constant amplitude output signal from a weak input signal.

10. As the signal-to-noise ratio of a received signal improves, higher order modulations can be used, carrying more bits per symbol. Note that with a PM signal, distance of a received symbol from a boundary threshold is a design consideration, as is a distance from the perimeter of a circle to the origin in a phasor diagram (I=0, Q=0 volts). In broadcast transmissions, changing modulation order may not be possible. In upstream transmissions, either the order of the modulation can be increased or the transmit power can be reduced.

11. In FIG. 1 a central unit is transmitting to multiple remote units, presumably using a common downstream broadcast signal. Generally, not all remote units are interested in receiving data that is intended for other remote units, or that they are not interested in receiving. A better approach is to occasionally send a downstream "index frame" which tells the remote units which data are intended for whom, or what is the nature of the remote data. For example, not all listeners are interested in the news, and the weather, and then sports. The reason this is better approach is that it takes receiver power to decode a message encoded using an efficient forward error correction code, such as a Gallagher or LDPC (low density parity check) code, and power translates to battery life for portable units.

12. Signal amplifiers, including saturated amplifiers should have low PM-AM conversion, and low PM-PM distortion. In other words, output phase should be a faithful replica of the input.

13. In optical transmissions, an optical delay element can be used for phase modulation. This is a much simpler approach than amplitude modulation using a Mach Zehnder interferometric structure.

14. Multicarrier signals start and stop abruptly, and while they remain orthogonal to each other, they can interfere with other non-related adjacent transmissions. A common modulation technique is to use Tukey or raised cosine tapering to reduce out-of-band interference, at the expense of bandwidth (time) efficiency. This time-domain tapering can be used for PM-OFDM (A) and PM-LP-OFDM (A) signals. Tapering can occur during the guard interval, or cyclic extension, to prevent a loss of information or intersymbol interference (ISI). Block orthogonality will not be affected.

15. Nonlinear mixing of the baseband signal by the phase modulation can be modeled by a Taylor series, or it can be estimated by Carson's Rule. A preferred method to estimate spectral power density can be made with a computer program or with a Matlab simulation.

16. A hardware simulation/demonstration/proof of concept was done using an Agilent 33220A arbitrary signal generator and the signal was received using a Tektronix TDS1002 digital oscilloscope. Modulation and demodulation were done digitally. Data was uploaded and downloaded with a GPIB (general purpose instrumentation bus) and processing was done with a personal computer using a C++ program. See code FIGS. 12A, 12B. 13A and 13B for sample code.

In the hardware simulation, the digital oscilloscope sampled at a rate of 50 Msamples/sec, capturing 2048 points in 40.96 microseconds. The center frequency of the modulated PM-OFDM (A) and PM-SC-OFDM (A) signals was 6.26 MHz. The FFT size was 2048 points at RF, 1024 points at baseband.

17. The Internet of things (IoT) describes physical objects (or groups of such objects) with sensors, processing ability, software and other technologies that connect and exchange data with other devices and systems over the Internet or other communications networks. This type of phase modulation is well-suited for use in such applications due to its power efficiency in transmitting and its ability to operate in poor signal-to-noise ratios.

18. In the spectral plots, frequencies are shown as index numbers, not Hertz. In time plots, time units are also shown as index numbers, not seconds. In digital signal processing this conversion is left to the reader, unless a specific application, such as Wi-Fi, is being discussed.

19. Another method to make something somewhat similar to SC-FDMA is to build a baseband single sideband signal (SSB), and use that real-only analytic signal to modulate a phase of a carrier. If desired, a raised cosine filter can be added. One caveat to this approach is that if the DC term in the transform is not zero, the carrier will jump phases between blocks.

20. Another method to phase modulate a carrier is to use a duobinary real-only signal. Duobinary is also known as Partial Response Signaling. Basically, each symbol becomes a linear addition of two adjacent source symbols. A real-only signal can be created by adding complex conjugates before performing an IFFT. The PM duobinary signal will produce more phase excursion in the middle of a time block than at the start and finish. This reduces interference with adjacent channels that are non-orthogonal.

21. Linear distortion may be added to the transformed signal after the IFFT but before phase modulation. For example, the linear distortion may be up tilt or downtilt (pre-emphasis or de-emphasis). This can be done to shape output spectrum.

22. A receiver in the central unit can receive and process only part of an entire composite received signal. This can be done by using a bandpass filter to only pass desired subcarriers. However, with PM-OFDM (A) and PM-SC-OFDMA an entire block must be band-passed and processed intact because of the nonlinear PM modulation.

23. The parameters of k factor, the number of baseband modulated subcarriers, truncated subcarriers and the modulation order can be adjusted to maximize carrier robustness and data throughput depending on received signal strength.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and systems, which as a matter of language, might be said to fall therebetween.

What I claim is:

1. A method for transmission of data comprising the steps of:

coding data to be transmitted by translating each group of one or more bits of said data into an input baseband symbol sequence, inserting into said input baseband symbol sequence coefficients that have values that are complex conjugates of said input baseband symbols making a double-length input baseband symbol sequence, using an electronic processor to perform an inverse orthogonal transformation on said double-length input baseband symbol sequence to obtain a real-only phase angle sequence, utilizing a phase modulator to create a phase modulated subcarrier block, transmitting said phase modulated subcarrier block, receiving said phase modulated subcarrier block, extracting a phase angle as a function of time to obtain a received phase angle vs. time sequence, performing an orthogonal transformation on said received phase angle sequence to obtain a copy of said set of input baseband symbol sequence, converting said symbols to bits.

2. Method of claim 1 wherein said orthogonal transform is a Fourier transform.

3. The method of claim 1 wherein linear distortion in said received phase modulated carrier is canceled.

4. The method of claim 1 further comprising the step of bandwidth reduction using subcarrier truncation.

5. The method of claim 1 further comprising nulling of baseband subcarriers adjacent to the center subcarrier to improve center subcarrier recovery at the receiver.

6. The method of claim 1 further comprising the steps of linear precoding said transform coefficients.

7. The method of claim 6 further comprising the step of bandwidth reduction using subcarrier truncation.

8. The method of claim 6 further comprising the setep of nulling baseband subcarrier adjacent to the center subcarrier to assist center subcarrier recovery.

9. A system for data transmission comprising steps of converting a sequence of bits to an input baseband symbol sequence, adding complex conjugates of said symbol sequence to said input baseband symbol sequence making a double-length input baseband symbol sequence, transforming said double-length input baseband symbol sequence to make a real-only phase angle sequence, phase modulating a carrier with said real-only phase angle sequence, to make a phase modulated subcarrier block, transmitting said phase modulated subcarrier block into an assigned radio frequency band, receiving said phase modulated subcarrier block, recovering phase angle of said phase modulated carrier to make a phase angle vs. time sequence, transforming said phase angle sequence with a reverse transform to make a received baseband symbol sequence, extracting bits from said received symbol sequence.

10. A system for enabling a plurality of remote locations to transmit data to a central location comprising the steps of a central unit assigning to each of said remote locations a mutually exclusive contiguous assigned radio frequency band comprised of an integer number of contiguous subcarriers, each remote location encoding a sequence of bits into an input baseband symbol sequence, each location appending complex conjugates to said input baseband symbol sequence to make a double-length input baseband symbol sequence, each remote location, using an electronic processor, performing an inverse orthogonal transformation on said double-length input baseband sequence to obtain a real-only phase angle sequence; at each remote location, utilizing a phase modulator to phase modulate a carrier with said real-only phase angle sequence, at each location truncating subcarriers from said phase modulated subcarrier block to create a truncated phase modulated subcarrier block, frequency mixing said truncated phase modulated subcarrier block into the radio frequency band that was assigned to said remote location.

11. A system according to claim 10 where said sequence of complex sequences is linearly precoded.

* * * * *